Oct. 11, 1960 L. A. RUNTON 2,955,969
CONVEYOR BELT FOR CORRUGATED PAPER BOARD
Filed March 4, 1957
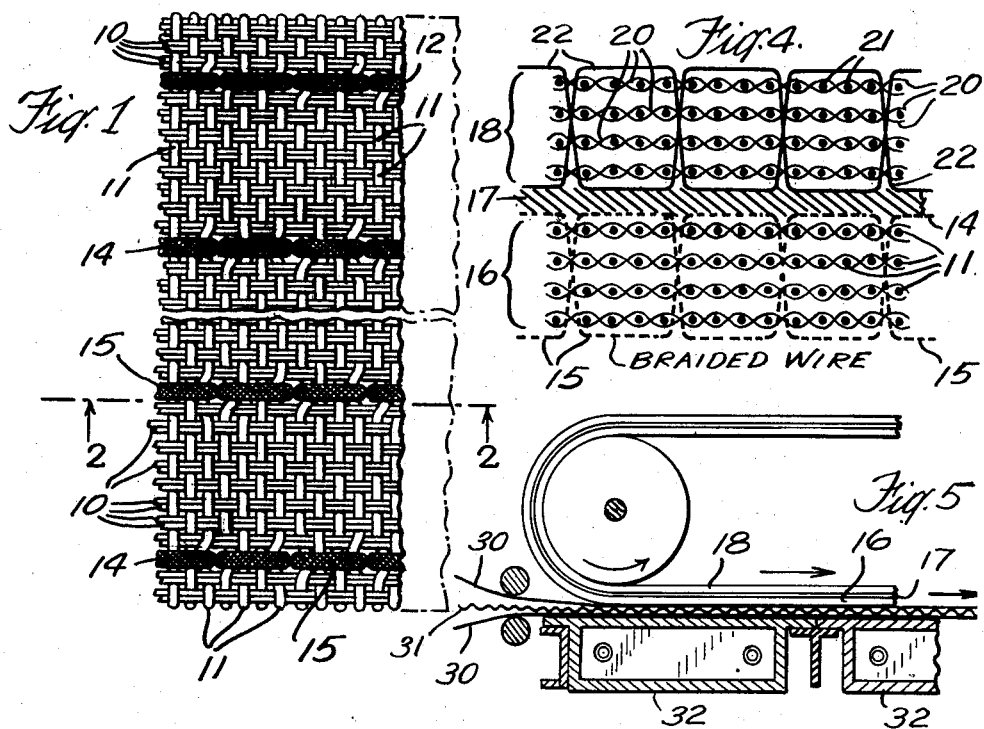
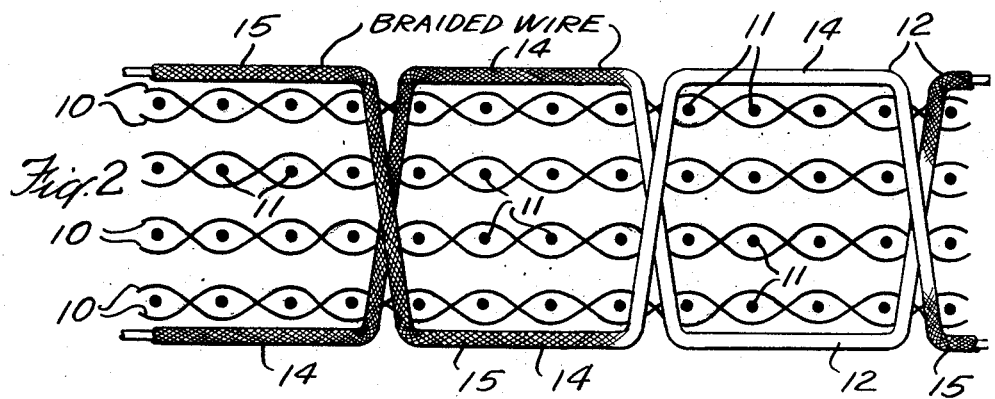
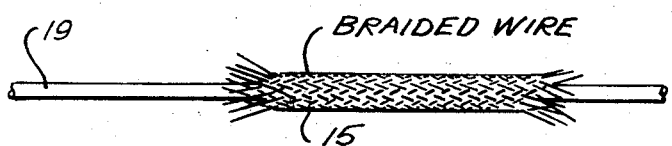
INVENTOR
LESLIE A. RUNTON
BY
ATTORNEY

United States Patent Office 2,955,969
Patented Oct. 11, 1960

2,955,969

CONVEYOR BELT FOR CORRUGATED PAPER BOARD

Leslie A. Runton, Middle Haddam, Conn., assignor to The Russell Manufacturing Company, Middletown, Conn., a corporation of Connecticut Filed Mar. 4, 1957, Ser. No. 643,811

2 Claims. (Cl. 154—52.1)

This invention relates to conveyor belts and more particularly to belts for use in heating or drying processes.

The invention is applicable in a specific embodiment to processes for assembling or forming corrugated paper board.

In the assembling or forming of the basic material which makes corrugated cardboard boxes, the two outside flat sheets and the inside corrugated sheet of cardboard are all treated with liquid glue such as sodium silicate or a starch. After cutting, the three sheets of paper come together and are pressed by a cotton belt onto a series of flat steam-heated platens to be dried, the heat being conducted from the platen directly to the cardboard carton material and through this material to the cotton belt.

The cotton belt, in turn, becomes hot and helps to vaporize off the water in the form of steam. The surface temperature of the platens may be of the order of 350° F., and a certain amount of heat is radiated as well as conducted through the paper.

Due to the fact that cotton is an insulator, the temperature of the belt due to its physical characteristics cannot reach the point where water vapor is changed to steam. The belt tends to condense the water and wick it through, then vaporize it off in the back.

If the temeprature of the belt could be raised sufficiently and the back of the belt insulated to maintain this heat on the surface of the belt, then the belt would act as a steam vapor drying mechanism. This means that the belt would always have to be 35° to 40° above the boiling point of water, so that any steam condensing on the belt would be vaporized off continuously.

As part of the time the belt is in contact with the wet corrugated cardboard and part of the time the belt is returning to its original position, when passing through the air, the ability to retain heat in the belt would help to drive off moisture during this returning period.

Therefore an object of this invention is to provide a heat sink within the belt, so that the belt can maintain a high temperature above the boiling point of water, in order that the drying operation involve driving off any moisture in the form of steam.

Another object is to improve the rate of drying corrugated board and the like as it is advanced over a heated platen.

Other objects and advantages will be apparent as the nature of the invention is more fully disclosed.

In accordance with the invention a multi-ply belt is provided in which the inner ply contains metal strands which are adapted to absorb and store heat so that the belt temperature can be raised above the boiling point of water. This ply may be made of Dacron or other heat-resistant material which can be subjected to elevated temperatures such as 350° F.

This under ply is joined to a second ply of rubber to prevent heat transfer, and an upper ply of cotton belting to bring the belt to the desired thickness.

The invention will be better understood by referring to the following description taken in connection with the accompanying drawing in which a specific embodiment has been set forth for purposes of illustration.

In the drawing:

Fig. 1 is a broken plan view of a belting embodying the present invention;

Fig. 2 is an expanded section taken on the line 2—2 of Fig. 1;

Fig. 3 is a detail view of the braided wire;

Fig. 4 is an expanded detail view of a three-ply belt; and

Fig. 5 is a broken elevation of an apparatus for drying corrugated board using the belt of Fig. 4.

Referring to the drawing more in detail, the weave shown in Fig. 2 comprises a four-ply woven fabric in which each ply consists of a pair of chain warps 10 and filler yarns 11. The four plies are bound together by a series of binder warps or wires 12 which pass through the plies between successive filler yarns 11 at intervals and form loops 14 which lie on the surface of the fabric.

The wire 12 is shown in detail in Fig. 3 as comprising a plurality of strands 15 of a metal having good heat transfer and a long life when subject to repeated flexing, such as an alloy of copper, nickel and brass. These metal strands 15 are braided about a core 19 of Dacron or other heat-resistant fiber to provide the required body.

Several such metal wire binders 12 are disposed across the fabric, the number and spacing depending upon the heat absorption characteristics required. Other non-metal binder yarns not shown may be used between the metal wires 12 if desired.

The yarns 10 and 11 and the non-metal binder yarns 19 may be composed of cotton as in the usual belting. A temperature resistant fiber, such as Dacron, is preferred however if the belt is to be used at elevatd tmperatures above 212° F.

A belting, as shown in Fig. 4, may be composed of an under ply 16 of the fabric of Fig. 2, a ply 17 of rubber or the like which may be vulcanized to the ply 16, and an upper ply 18 composed of a fabric having a weave similar to that of Fig. 2 but composed of cotton yarns or the like and bonded to the rubber ply 17 by vulcanizing or by a heat resistant adhesive.

In the form shown in Fig. 4 the ply 18 comprises four woven plies, each having a pair of chain warps 20 and filler yarns 21 bound together by binder yarns 22, the yarns 20, 21 and 22 being composed of cotton.

Fig. 5 illustrates the use of the belt of Fig. 4 for making corrugated board wherein a pair of flat paper sheets 30 with a corrugated sheet 31 interposed therebetween and carrying a surface coating of adhesive, not shown, are fed over heated platens 32 with the top sheet 30 in contact with the under ply 16 of the belt by which the board is advanced.

The board is heated by the platens 32 to a temperature to drive off the moisture as steam. The heat transmitted through the board heats the under ply 16 of the belt, which due to the metal wire 12 absorbs and retains the heat and re-transfers the heat to the upper surface of the board to act as a steam vapor dryer. The ply 16 attains a temperature above 212° F. whereby condensation of the steam from the board is eliminated or reduced. The rubber ply 17 prevents wetting of the upper ply 18 and services to confine the heat to the lower ply 16.

This construction permits the drying operation to be carried out more rapidly and at higher temperatures than are possible when an all cotton belt is used thereby allowing an increased rate of production.

The composite belt above described is useful for other purposes wherein elevated temperatures and heat retention are required.

What is claimed is:

1. A conveyor belt comprising at least two fabric layers and a layer of moisture impevious rubber disposed therebetween and bonded thereto to form a unitary structure, said fabric layers each consisting of a plurality of woven plies, each ply consisting of filler yarns and chain warp yarns, and binder yarn extending through the plies of each of said fabric layers to bind the same together, the binder yarns in one of said fabric layers comprising metal wire and being adapted to form heat transfer elements extending entirely through said layer and forming loops extending over the surfaces of said layer, said layers being united by the moisture impervious rubber layer forming a heat insulating and reflecting layer to prevent transfer of heat and moisture from one fabric layer to the opposite fabric layer.

2. A conveyor belt as set forth in claim 1 in which said metal binder yarns comprise metal strands braided about a non-metal core.

References Cited in the file of this patent

UNITED STATES PATENTS

| 459,082 | Maddox | Sept. 8, 1891 |
| 2,001,539 | Nanfeldt | May 14, 1935 |
| 2,256,756 | Brown | Sept. 23, 1941 |
| 2,511,581 | Grisby | June 13, 1950 |
| 2,725,640 | Voigtman | Dec. 6, 1955 |
| 2,727,844 | Adams | Dec. 20, 1955 |
| 2,746,166 | Stevens | May 22, 1956 |

FOREIGN PATENTS

| 23,415 | Great Britain | 1893 |
| 333,279 | Great Britain | Aug. 8, 1930 |
| 447,299 | France | Oct. 24, 1912 |
| 353,954 | Italy | Nov. 5, 1937 |